United States Patent [19]
Goetzl

[11] Patent Number: 5,721,539
[45] Date of Patent: Feb. 24, 1998

[54] SPEEDOMETER FOR IN-LINE SKATES

[76] Inventor: Brent A. Goetzl, 1240 Post St., Alameda, Calif. 94501

[21] Appl. No.: 541,912

[22] Filed: Oct. 10, 1995

[51] Int. Cl.$^6$ ............................................. G08C 19/00
[52] U.S. Cl. .......................... 340/870.3; 340/870.05; 340/870.28; 324/166; 235/95 R; 377/24.2
[58] Field of Search ............ 340/870.01, 870.05, 340/870.18, 870.19, 870.28, 870.3, 870.31, 670, 671; 73/493, 494, 530; 324/160, 166, 168, 171, 174, 175; 235/95 R, 96, 103, 133 A; 377/24.2; 280/809, 816, 841, 11.19

[56] References Cited

U.S. PATENT DOCUMENTS

| | | | |
|---|---|---|---|
| 4,454,411 | 6/1984 | Hale et al. | 235/95 R |
| 4,546,650 | 10/1985 | Cameron | 73/490 |
| 4,780,864 | 10/1988 | Houlihan | 368/10 |
| 5,170,161 | 12/1992 | Sakurai | 340/870.3 |
| 5,177,432 | 1/1993 | Waterhouse et al. | 324/166 |

*Primary Examiner*—Jeffery Hofsass
*Assistant Examiner*—Andrew Hill
*Attorney, Agent, or Firm*—Thomas Schneck; George B. F. Yee

[57] ABSTRACT

An in-line roller skate includes a transducer portion capable of sensing the rotary movement of at least one wheel on the roller skate and transmitting information concerning the same to a receiver worn on a user's wrist. In the preferred embodiment, the transducer portion includes a magnet attached to one of the plurality of wheels and a sensor positioned in a shoe portion to detect the magnet and produce electrical pulses containing information corresponding to the angular velocity of the wheel. The transducer portion also includes a micro-controller, a transmitter and an antenna. The micro-controller creates a digital data stream containing information corresponding to the angular velocity of the wheel, which is then modulated onto a carrier wave produced by the transmitter. The transmitter transmits the coded signals to the receiver. The receiver demodulates the carrier wave, reproducing the digital data stream. A microprocessor processes the modulated signals and drives the display to produce a real time visual representation of selected portions of information contained in the digital data stream, including speed and distance travelled by the skate.

24 Claims, 5 Drawing Sheets

SPEEDOMETER FOR IN-LINE SKATES

TECHNICAL FIELD

The present invention pertains to the field of roller skates. Specifically, the present invention pertains to a data transmission system, and more particularly a speedometer, suited for use with a roller skate.

BACKGROUND ART

Skating on in-line roller skates is fast becoming one of the most popular outdoor activities. Recently, there has been an increase in competitive sport activities developed around the in-line roller skate, such as in-line speed skating and roller street hockey. These competitive sports have lead many in-line roller skate athletes to undertake more regimented workouts. Important to determining the quality of a workout is knowing the speed one is skating and the distance traveled, as well as information concerning one's cardiovascular system, e.g., heart-rate. In addition, many local municipalities have passed speed laws in various areas frequented by in-line roller skaters, thereby increasing the necessity of knowing the speed traveled during a workout.

There are many devices that can provide the aforementioned information to an athlete. U.S. Pat. No. 5,177,432 to Waterhouse et al. discloses a wireless velocity detector for a bicycle including a transmitter mounted onto the hub of a wheel and a receiver mounted onto the handlebars. The transmitter includes an LC oscillator producing a signal having a predefined frequency and a pair of mercury switches to ensure that the transmitter is energized only upon sensing rotary movement. A coil is connected to receive the signal from the LC oscillator and functions as the radiating element of the transmitter. The coil radiates a magnetic field in the plane of the wheel, once for each revolution of the transmitter. The speed of the rotating magnetic field is proportional to the rate of the wheel's rotation. The receiver includes a CPU, an LCD, driven by the CPU, and a set of coils. The set of coils detect the magnetic field generated by the transmitter to generate continuously changing analog signals. The analog signals are digitized by an analog to digital converter and then passed on to the CPU. The CPU processes the signals and displays the information represented by them on the LCD. For example, the signals may represent velocity, RPM of the wheel or distance traveled.

U.S. Pat. No. 4,780,864 to Houlihan discloses a wristwatch that also serves as a computer to display speed, distance and pedaling cadence. The wristwatch functions as a receiver and is and placed in a special mount attached to the handlebars of the bicycle. A first permanent magnet is attached to one of the wheels and a second permanent magnet is attached to the pedal sprocket. Sensors are disposed upon the frame of the bicycle and positioned to detect the magnets. The wristwatch is hard-wired to each sensor via the special mount. In this fashion, the sensors detect and transmit, to the wristwatch, the rate of revolution for both the wheel and the pedal sprocket. The wristwatch includes a CPU to process the data received from the sensors and produce the requisite information, such as speed and distance traveled.

U.S. Pat. No. 4,546,650 to Cameron discloses a speed and distance calculator for skis which includes a toothed wheel extending from the back of a ski to come into frictional contact with snow. Two magnets are attached to the toothed wheel inductively coupling the toothed wheel to a Hall effect device, which is mounted on the back of the ski. In this fashion, the toothed wheel functions as a transmitter and the Hall effect device functions as a receiver. The Hall effect device is hard-wired to a microprocessor. The microprocessor receives signals from the Hall effect device indicative of the rate of rotation of the tooth wheel and processes these signals to determine the distance traveled by the ski.

U.S. Pat. No. 4,454,411 to Hale et al. discloses a conventional odometer attached to the rear truck of a roller skate. The odometer includes a plurality of digit carrying discs, all interconnected by suitable shafts and gears, to produce a sequential display in a magnifying window indicating a distance travelled by the skate. A rubber wheel extending from the rear of the roller skate frictionally engages the ground. The rubber wheel is connected to a shaft of the odometer to transmit the number of revolutions the rubber wheel has undergone. The odometer is calibrated appropriately to properly indicate the distance travelled by the skate as a function of the revolutions of the rubber wheel.

A problem with the aforementioned prior art devices is that the transmitter and the receiver are designed to be communicated over a fixed radial distance, making them unsuitable for providing a real-time visual representation to a user of a roller skate.

Therefore, it is an object of the present invention to have a wireless speedometer providing a real-time visual representation of information, such as the speed and distance traveled, to a user of a roller skate.

SUMMARY OF THE INVENTION

The above object has been achieved by providing an in-line roller skate with a transducer portion capable of sensing the rotary movement of at least one wheel on the roller skate and transmitting information concerning the same in a wireless manner to a receiver worn on a user's wrist. In the preferred embodiment, the transducer portion includes a magnet attached to at least one of the plurality of wheels and a sensor positioned in a shoe portion of the roller skate to detect the magnet, thereby producing pulses corresponding to the angular velocity of the wheel. The transducer portion also includes a micro-controller, a transmitter and an antenna. The micro-controller is electronically coupled to both the detector and the transmitter. The micro-controller and the transmitter may both be formed on a monolithic chip. The transmitter is electronically coupled to the antenna. The micro-controller conditions and averages the time between pulses produced by the sensor, creating a digital data stream containing information corresponding to the angular velocity of the wheel. The micro-controller then modulates a carrier wave produced by the transmitter with the digital data stream and a plurality of control signals, including an identification code, producing coded signals. The identification code uniquely associates the transducer portion with the coded signals. The transmitter transmits the coded signals to the receiver. The receiver includes an antenna, a microprocessor and a display driven by the microprocessor. The antenna receives the coded signals and sends them to the microprocessor. The detector demodulates the coded signals, reproducing the digital data stream. The microprocessor processes the data stream deriving information therefrom concerning velocity and distance travelled by the skate. The display is driven by the microprocessor to produce a real-time visual representation of selected portions of the information.

In an alternate embodiment, the control wheel includes a chamber, proximate to the wheel's center, with a source of light contained therein. The source of light may be an LED or laser diode. At least one bore hole extends from the chamber and terminates in at least one aperture at the periphery of the control wheel. The transceiver includes an optical detector which may be disposed proximate to a hole in the shoe portion. The optical detector senses light emitted through the apertures and produces an electrical signal corresponding to the angular velocity of the control wheel.

BEST MODE FOR CARRYING OUT THE INVENTION

Figure 1:
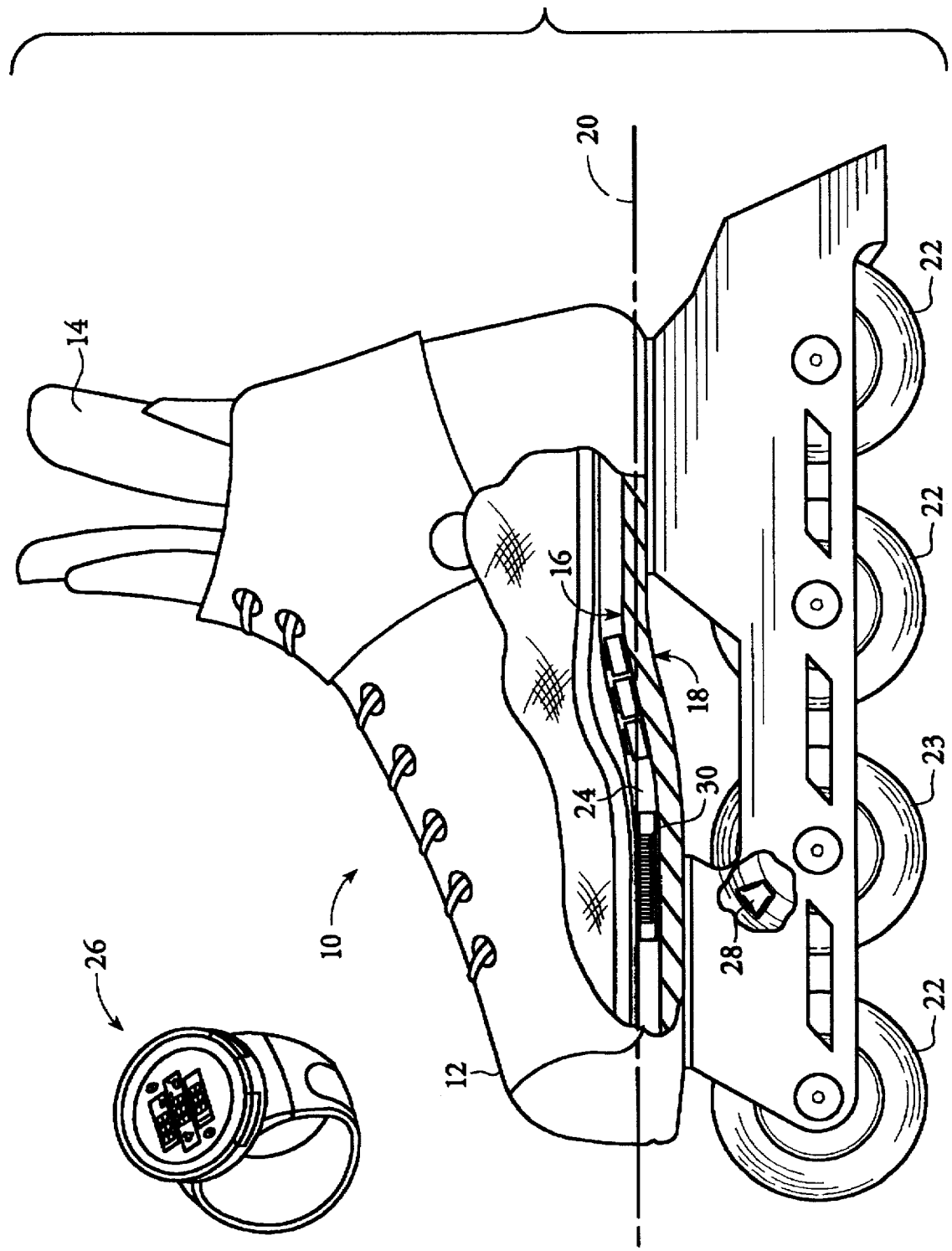
FIG. 1 shows a side view of an in-line roller skate including a transducer portion and a receiver, in accord with the present invention.

In FIG. 1, an in-line skate 10 is shown including a shoe portion 12 designed to receive a removable liner 14 having a shape to fit over a human foot and the lower portion of a leg extending from the foot. The shoe portion 12 includes a sole having first 16 and second 18 opposed major surfaces extending along the entire longitudinal axis 20 of the skate 10. The liner 14 includes a bottom surface 15 which rests adjacent to the first major surface 16, upon the liner 14 reaching a final seating position. The skate 10 is considered in-line because a plurality of wheels 22, rollably attached to the second major surface 18, are coaxially aligned along the longitudinal axis 20. Mounted proximate to the first major surface 16 is a transducer portion 24 to produce modulated signals containing data corresponding to rotational movement of the wheels 22. A receiver 26 is in communication with the transducer portion 24 to receive the modulated signals. The receiver 26 includes a display device, such as an LCD, to produce a real-time display of selected portions of information derived from the data, including speed and distance travelled by the skate 10. The signals produced by the transducer portion 24 may be acoustic. In this manner, the transducer portion 24 and the receiver 26 are acoustically coupled, placing them in acoustical communication. It is preferred, however, that the transducer portion 24 produce electromagnetic signals, placing the receiver 26 in radio communication therewith. At lower frequencies, i.e. 10 to 250 kHz, the communication between the transducer portion 24 and the receiver 26 would be achieved primarily by a magnetic field. At higher frequencies, i.e. 100 MHz to 2.5 GHz, communication would be achieved primarily by an electric field.

A magnetic base 28, containing one or more permanent magnets, is attached to at least one of the wheels, defining a control wheel 23. The magnetic base 28 may be attached to the control wheel 23 with a suitable adhesive, or the magnetic base 28 may be integrally molded with the control wheel 23. Integrally molding the magnetic base 28 with the control wheel 23 allows the magnets to be disposed proximate to the wheel's centerline, thereby having little effect on wheel balance. The transducer portion 24 includes a revolution detector 30 positioned to sense the magnetic base 28. The revolution detector 30 may be a pick-up coil or other inductively coupling mechanism, such as a reed switch or Hall effect device. Typically, the revolution detector 30 is positioned above the control wheel 23 and operates as a transducer to detect the changing magnetic field generated by the magnetic base 28 and produce pulses corresponding to the rotational movement of the wheels 22. Specifically, the revolution detector 30 produces pulses containing raw data corresponding to the rate of rotation of the control wheel 23.

Figure 2:
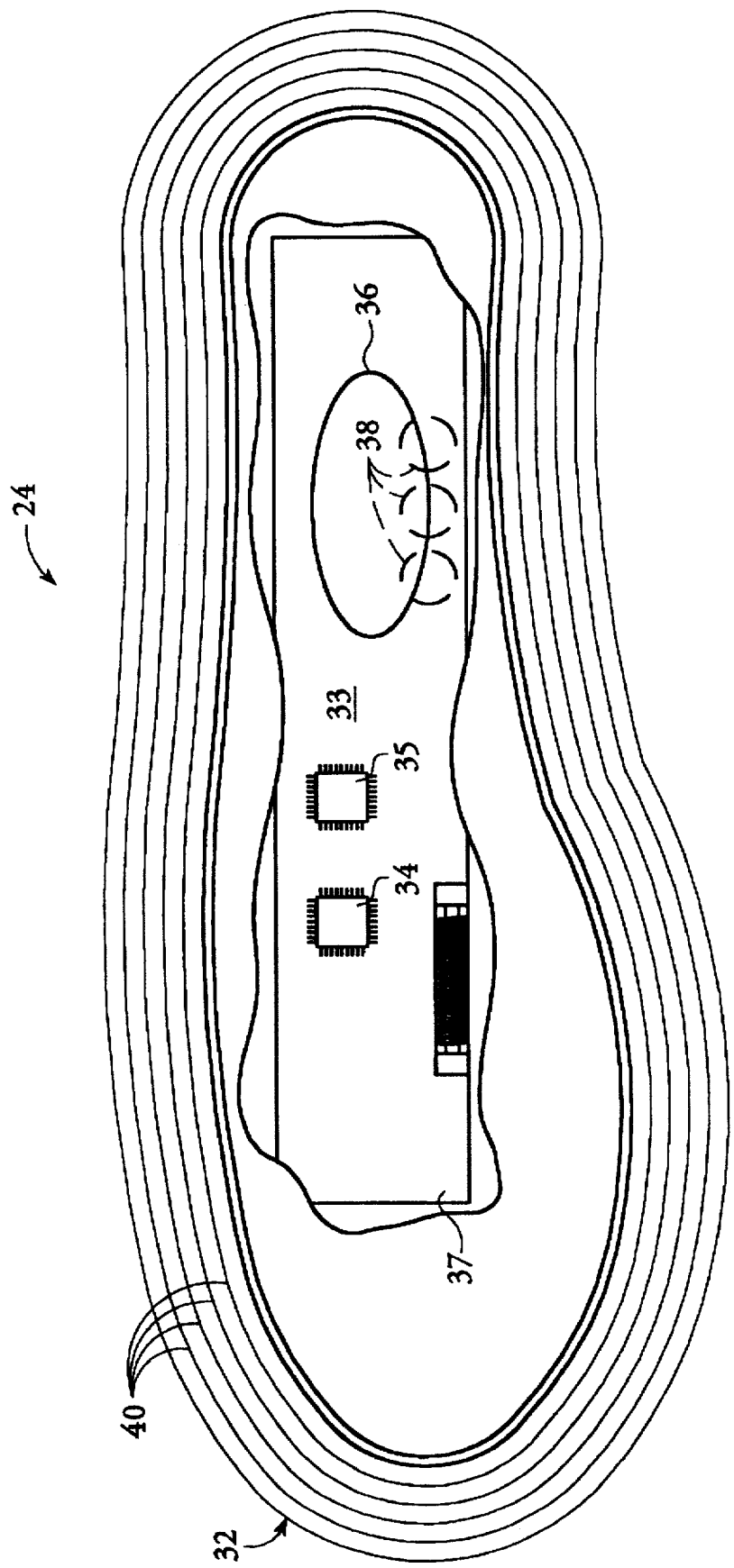
FIG. 2 shows a top cut-away view of the transducer portion encapsulated in a support housing, shown in FIG. 1.

Referring also to FIG. 2, the transducer portion 24 is shown attached to a support body 32 having a profile matching the profile of the first major 16 surface of the shoe portion 12. In addition to the detector 30, the transducer portion 24 includes a microcontroller 34, a transmitter 35 and an antenna 36. Also included is a suitable power source 38, such as batteries, to power the transducer portion 24. The microcontroller 34 and the transmitter 35 may both be formed on a single monolithic chip, but are shown separate for demonstrative purposes. The micro-controller 34 is electronically coupled to receive the pulses from the revolution detector 30. The transmitter 35 is electronically coupled to both the micro-controller 34 and the antenna 36. The micro-controller 34 conditions and averages the time between pulses produced by the detector 30, creating a digital data stream from the raw data. The micro-controller 34 preferably measures the period from edge to edge of each of the pulses produced by the detector 30. This provides great accuracy, especially for low revolutions per second of the control wheel 23. The micro-controller 34 then modulates a carrier wave produced by the transmitter 35 with the digital data stream and a plurality of control signals, including an identification code to produce coded signals. The control signals will be discussed more fully below. The transmitter 35 transmits the coded signals to the receiver 26 via antenna 36.

Figure 3:
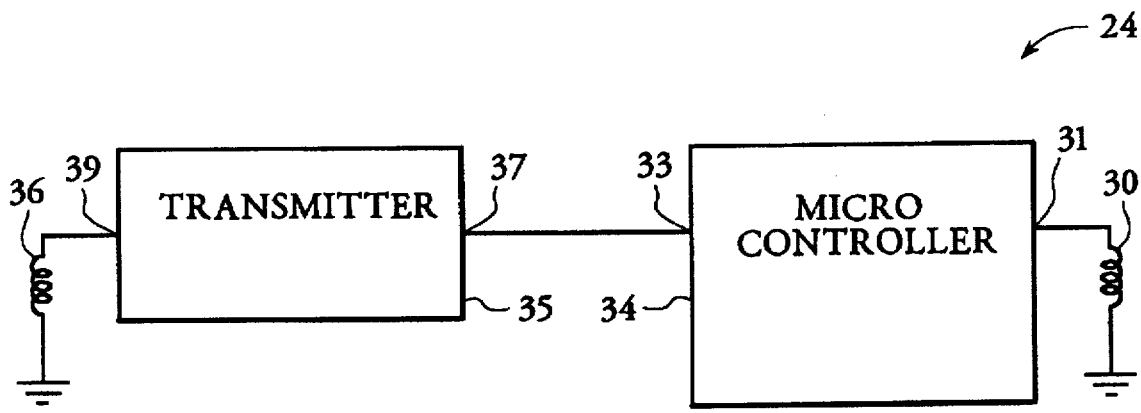
FIG. 3 is a simplified schematic view of the circuitry of the transducer portion shown in FIG. 2.

Referring also to FIG. 3, shown therein is a simplified schematic of the transducer portion, showing the revolution detector 30 in electrical communication with the input 31 of the micro-controller 34. The input 37 of the transmitter 35 is in electrical communication with the output 33 of the micro-controller 34. The output 39 of the transmitter 35 is in electrical communication with the antenna 36. The transmitter 35 may be of any design desired, but preferably has a small footprint and is compatible with the power source 38. The micro-controller 34 is preferably an MC68HC785P9 and is available from Motorola, Inc. The micro-controller 34 is typically programmed with an algorithm to appropriately condition the pulses so that they are suitable for transmission by the transmitter 35.

The support body 32 is designed to rest between a foot of a user wearing the skate and the first major surface 16. To that end, the transducer portion 24 is usually manufactured on a single printed circuit board 33 and is of reduced thickness so that the support body 32 may completely encapsulate the transducer portion 24. The support body 32 is rigid to protect the transducer portion 24 from stresses associated with roller skating. In addition, the support body 32 may be hermetically sealed to protect the transducer portion 24 from moisture, as well. Due to the size of the power source 38, it is typically located so that it lies beneath the arch of the foot of the skate 10's user. The power source 38 provides, therefore, added support for the skate 10's user in an unobtrusive manner. To allow access to the power source 38, a removable cover may be present.

The support body 32 may be integrally formed with the shoe portion 12 of the skate 10. It is preferred, however, that the support body 32 is removably attached to the first major surface 16. One manner in which to achieve the removable attachment of the support body 32 is to affix the support body 32 to the bottom surface 15 of the liner 14, or alternatively the support body 32 may be inserted between the liner 14 and the first major surface 16. This allows the present invention to be available as an after-market accessory for in-line roller skates. To facilitate the manufacture of the support body 32, it may be constructed to fit the largest shoe-size available. Manufacturing a support body 32 of only one size reduces the tooling costs. The end-user may trim the support body 32 to the appropriate size of the shoe portion 12 using, for example, a pair of scissors. To that end, the support body 32 may include markings 40, such as grooves or lines, to indicate differing sizes. The end-user would cut along the appropriate markings 40 to provide a satisfactory fit with the first major surface 16 of the appropriate shoe portion 12.

Figure 4:
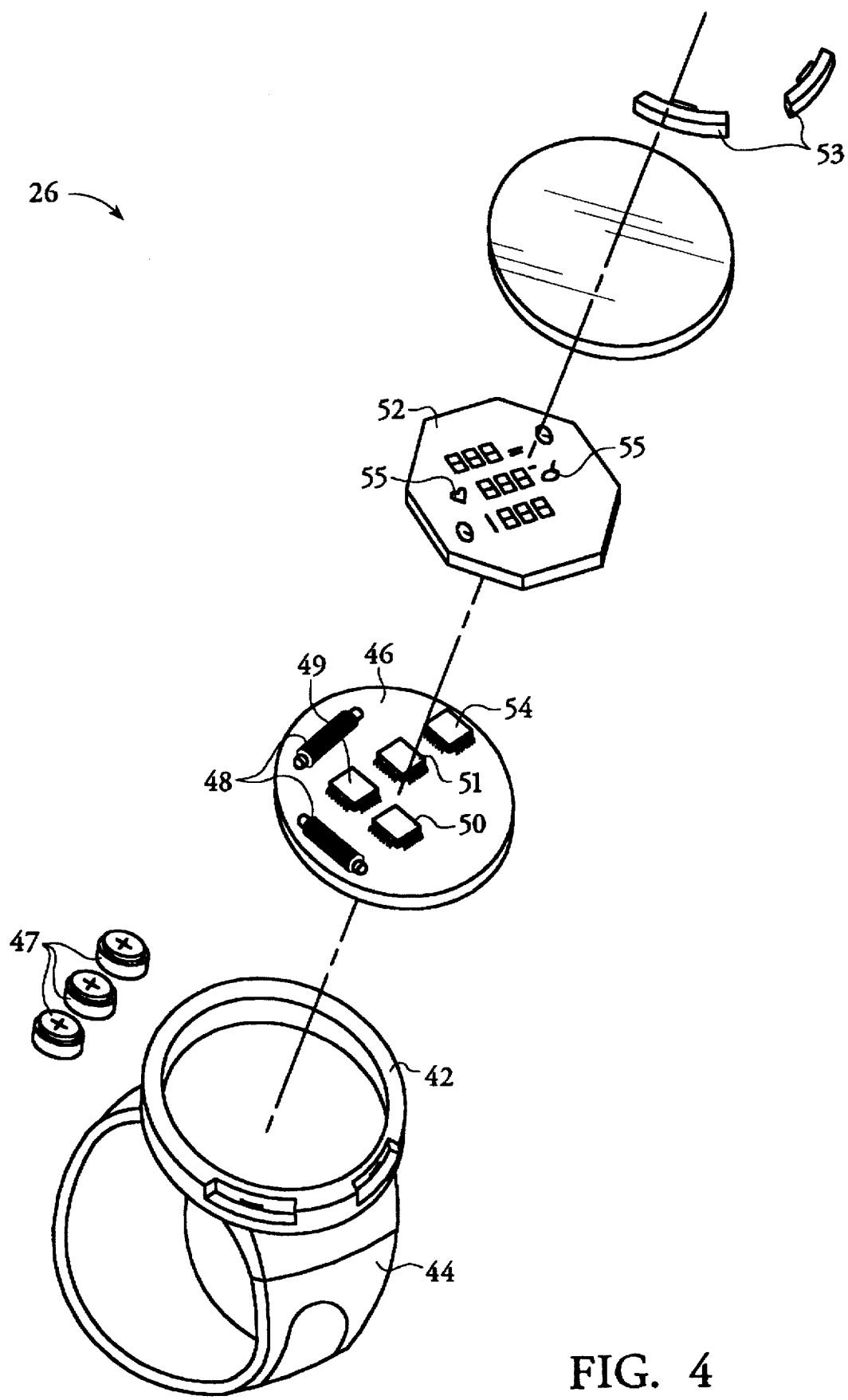
FIG. 4 is an exploded perspective view of a receiver shown in FIG. 1, in accord with the present invention.

Referring also to FIG. 4, the receiver 26 is shown including a housing 42 and a strap 44 attached to the housing 42. The receiver 26 is configured so that it may be donned by a user in a manner similar to a wrist-watch. The circuitry is typically attached to a printed circuit board 46, which is powered by batteries 47, or any other suitable power source, and may include a plurality of antennas 48 electronically coupled to a microprocessor 50 via receiver circuitry 49. Antenna 48 places the receiver 26 in radio communication with the transducer portion 24 to receive the coded signals containing information corresponding to the rotational movement of the control wheel 23. Typically, there is only one antenna 48. However, there may be two antennas 48, oriented orthogonally with respect to each other, as shown. Having two antennas orientated as shown in FIG. 4 provides a more sensitive coupling to the magnetic field associated with the coded signals.

The modulated carrier wave received by antenna 48 is sent to the receiver circuitry 49 which demodulates the coded signal and reproduces the digital data stream for processing by the microprocessor 50. A display 52, such as an LCD, is attached to the housing 42 so as to be visible to a user wearing the receiver 26. The microprocessor 50 receives the digital data stream from the receiver circuitry 49. Having the diameter of the control wheel 23 preprogrammed in memory, the microprocessor calculates various information corresponding to the rotational movement of the control wheel 23, using a suitable algorithm. For example, the microprocessor 50 can determine information regarding speed and distance travelled by the skate. The display 52 is driven by the microprocessor 50 to produce a real-time visual representation of the speed and distance travelled in any units desired, e.g. metric or English. In this manner, selected portions of the information corresponding to the rotational movement of the wheels 22 is produced on the display 52. A plurality of switches 53 are operationally coupled to the microprocessor 50 to change the information visually represented on the LCD display 52 and to input data.

In addition, the microprocessor 50 may be electronically coupled to non-volatile memory 51 that may include preprogrammed data corresponding to a user's weight and height. The microprocessor 50 may also determine, based upon both the information corresponding to the rotational movement of the control wheel 23 and the preprogrammed information, parameters concerning the calories burned by the user. In addition, an orthogonal orientation of the antennas 48 would facilitate detection of signals transmitted by state of the art heart rate monitors which may be worn on the exterior of the chest. Alternatively, the receiver 26 may include circuitry capable of detecting, directly, the heart rate of a user. In this fashion, the microprocessor 50 may process signals associated with a user's heart rate and may transmits these signals to the LCD display 52. The microprocessor 50 may also incorporate information concerning the heart rate into the calculations to determine the amount of calories burned by the user, providing a more accurate measurement of the same. The memory 51 may also include stored information corresponding to a history of past distances and speeds associated with previous workouts.

To facilitate a user's rapid comprehension of the visual representations the on the display 52, internationally known graphical icons 55 may shown along with corresponding information. Instead of being worn as a wristwatch, the receiver 26 may be included in a safety helmet and mounted so as to be visible to a wearer. Additionally, the receiver 26 may be formed as a pair of glasses to be worn on a user's head.

Figure 5:
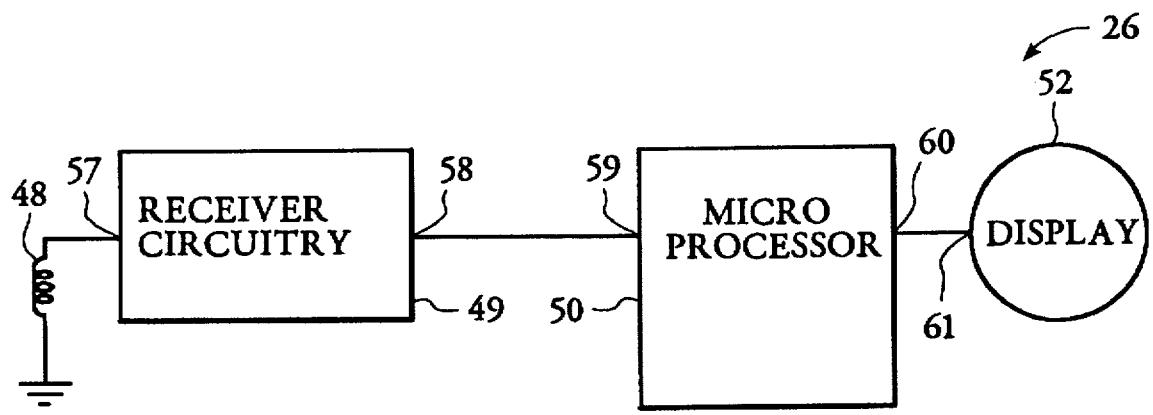
FIG. 5 is a simplified schematic view of the circuitry of the receiver shown in FIG. 4.

Referring also to FIG. 5, a simplified schematic view of the receiver 26 is shown with the antenna 48 in electrical communication with the input 57 of the receiver circuitry 49. The output 58 of the receiver circuitry 49 is in electrical communication with the input 59 of the microprocessor 50. The output 60 of the microprocessor 50 is in electrical communication with the input 61 of the display 52. Preferably, the receiver circuitry 49 is an operational amplifier. The microprocessor 50 is an LC58E68 and is manufactured by, and available from, Sanyo, Inc.

In operation, the transducer portion 24 is always in a state to sense a rotating magnetic field when the control wheel 23 rotates. The magnetic field rotates directly proportional to the rate of rotation of the control wheel 23. The revolution detector 30 produces pulses containing raw data corresponding to the rotating magnetic field, which is sent to the micro-controller 34. After conditioning, the pulses are converted into a digital data stream and modulated onto a carrier wave by the micro-controller 34. The micro-controller 34 also modulates the carrier wave with an identification code, along with other control signals, producing a coded signal. Any number of modulation schemes may be employed, e.g. amplitude, phase, or frequency-shift modulation. The identification code uniquely associates the coded signal with the transducer portion 24. The transmitter 35 transmits the coded signal at variable intervals of time via antenna 36. In this manner, the digital data stream may be transmitted periodically, e.g. every one to two seconds, forming a train of data.

Switches 53 may be depressed to place the receiver 26 in one of three modes: power-down, power-on or time-delayed deactivation mode. In the power-on mode, antenna 48 of the receiver 26 receives and demodulates the coded signal, reproducing the digital data stream corresponding to the rotational/angular velocity of the control wheel 23. Receiver circuitry 49 determines whether the appropriate code is present therein. If the appropriate code is not present therein, the receiver 26 will ignore the digital data stream. If the appropriate code is present, the receiver circuitry 49 sends the digital data stream to the microprocessor 50. The microprocessor 50 performs various calculations described above to determine velocity and distance travelled, as well as calories burned by the user. After performing the aforementioned calculations, the microprocessor 50 will drive the display 52 to provide a real-time visual representation of selected portions of the information.

In the time-delayed deactivation mode, an activation/ deactivation circuit 54, incorporated into the receiver 26, is activated. The circuit 54 may include a microprocessor to poll the antenna 48 and determine whether a coded signal is present. If such a signal is present, activation/deactivation circuit 54 automatically places the receiver 26 into the power-on mode. The receiver 26 will maintain the power-on mode for a predetermined amount of time in the absence of a coded signal. After a predetermined amount of time has lapsed, the activation/deactivation circuit 54 automatically places the receiver 26 into a wait state, thereby deactivating it. Upon the antenna 48 receiving a coded signal, the receiver 26 would once again be placed into the power-on mode by the activation/deactivation circuit 54. In the power-down mode, the receiver 26 is non-operational.

Transmitting a modulated carrier wave having an identification code uniquely associated with the transducer portion 24 enables many of these systems to operate in close proximity without cross-talk, because each receiver may be programmed to recognize only one identification code. This ensures that each receiver is in radio communication with only one transducer portion. The remaining control signals are a battery condition signal and a checksum signal. The battery condition signal contains information concerning the charge state of the power source 38. The checksum signal contains information concerning the amount of data present in the data stream. Typically, the transducer portion 24 and the receiver 26 operate at a frequency which enables filtering of unwanted signals that may be present in a surrounding environment. This allows the transducer portion 24 and receiver 26 to communicate over greater radial distances, depending upon the power of the transducer portion 24, thereby providing more flexibility with regard to the distances over which the transducer portion 24 and receiver 26 may communicate, i.e., the distance need not be fixed.

Figure 6:
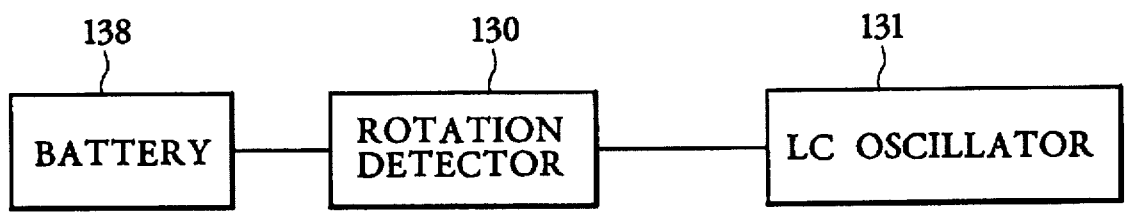
FIG. 6 is a block diagram of the transducer portion shown in FIG. 1, in accord with an alternate embodiment.

Although the transducer portion 24 has been discussed as modulating a carrier wave with a digital data stream, the carrier wave could be modulated with an analog signal, as well, thereby abrogating the need for the micro-controller 34. The receiver chip 49 would comprise of circuitry to demodulate the signal received from antenna 48 and also convert it into a digital data stream so that it may be processed by the microprocessor 50. Moreover, instead of transmitting a modulated radio frequency, the transducer portion 24 may transmit a periodic magnetic wave representative of the rotational movement of the wheels. One method in which to transmit and detect a rotating magnetic wave in discussed in U.S. Pat. No. 5,177,432 to Waterhouse et al. In this manner, the control wheel would contain a battery 138, rotation detector 130 and a PCB with an LC oscillator 131, as shown in FIG. 6 and discussed in Waterhouse et al.

Figure 7:
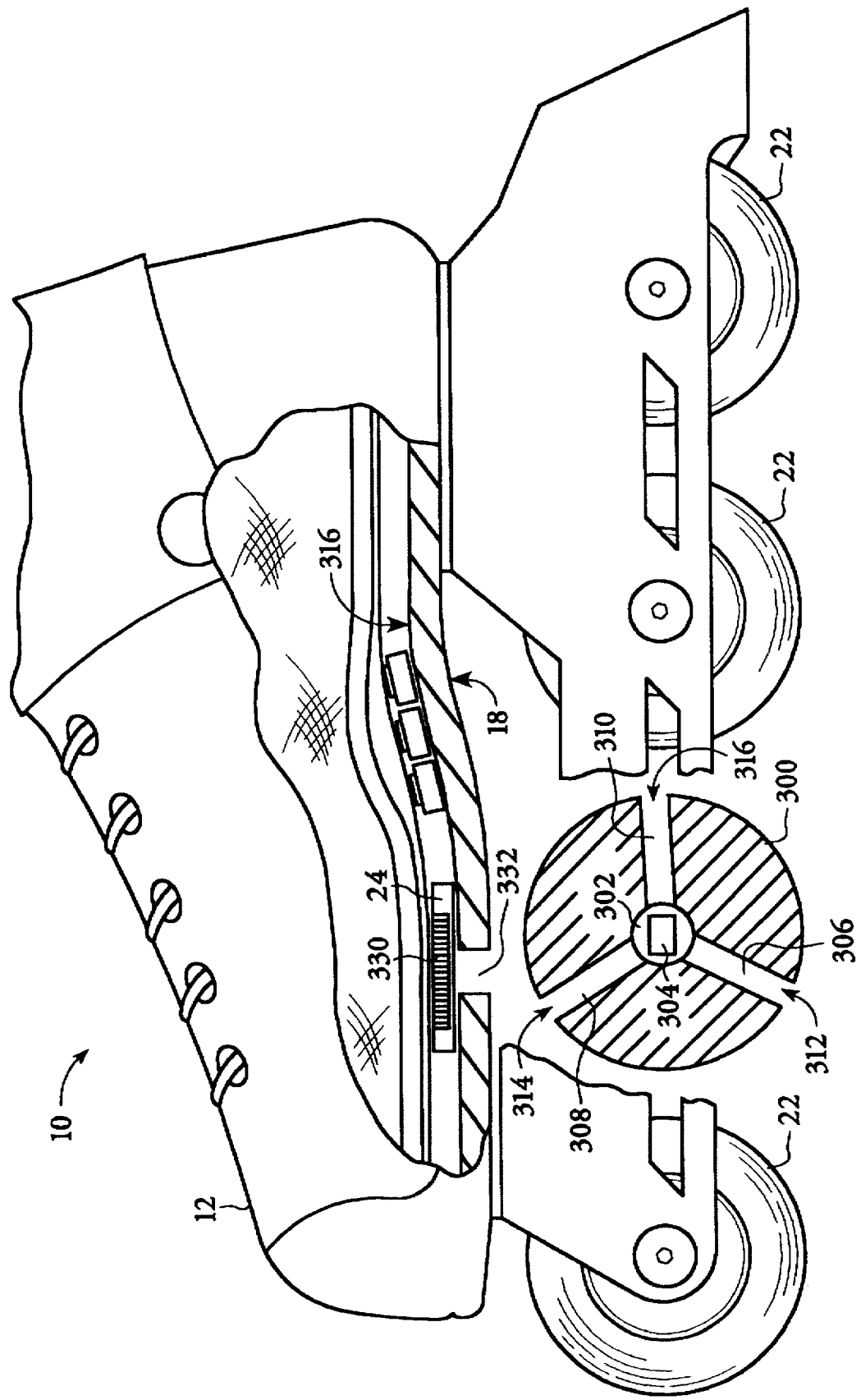
FIG. 7 is a side view of a revolution detector of the transducer portion, shown in FIG. 1, in accord with an alternate embodiment.

An additional embodiment, as shown in FIG. 7, includes a control wheel 300 having a chamber 302 proximate mate to the wheel's center, with a source of light 304 contained therein. The source of light may be an LED or laser diode. One or more bore holes 306, 308 and 310 may extend from chamber 302 and terminate in one or more apertures 312, 314 and 316, equally spaced about the periphery 318 of the wheel 300. The revolution detector 330 comprises of an optical detector which could be disposed proximate to a hole 332 in the first major surface 316 to sense light emitted through said apertures 312, 314 and 316. The revolution detector 330 would produce a pulse each time light is sensed. In this manner, the revolution detector 332 would produce pulses corresponding to the rotational movement of the control wheel 300. These pulses would be transmitted to the receiver as discussed above.

I claim:

1. A speedometer system for skates comprising:
   a roller skate including a sole with first and second opposed major surfaces and a plurality of wheels rollably attached to said second major surface;
   transducer means, disposed in said roller skate, for producing electrical pulses in response to a rotational movement of said plurality of wheels;
   means, in communication with said transducer means, for converting said electrical pulse into digitized data related to said rotational movements of said plurality of wheels;
   a transmitter, disposed in said roller skate, for receiving said digitized data and emitting corresponding signals containing said digitized data;
   wireless receiver means, in communication with said transmitter, for receiving said signals;
   means, in communication with said receiver means, for processing said signals to produce information related to said rotational movement, said information including an angular velocity of said wheels;
   display means, in electrical communication with said receiver means, for producing a real-time visual representation of said information; and
   a housing containing said processing means and said display means.

2. The system as recited in claim 1 wherein said wireless receiver means is in radio communication with said transmitter.

3. The system as recited in claim 1 wherein said wireless receiver means is in acoustic communication with said transmitter.

4. The system as recited in claim 1 wherein said housing includes means for attaching said housing to a wrist of the user.

5. The system as recited in claim 1 wherein said transducer means includes a means, attached to at least one of said plurality of wheels, for generating a rotating magnetic field; and means, mounted proximate to said first major surface, for converting said magnetic field into said pulses.

6. The system as recited in claim 5 further including a means for modulating said pulses onto a carrier wave.

7. The system as recited in claim 1 wherein said transducer means detects rotary movement of one of said plurality of wheels, defining a control wheel.

8. The system as recited in claim 7 wherein said transducer means is an optical sensor, whereby said rotary movement of said control wheel results in said optical sensor detecting light at a periodicity proportional to a rotational velocity of said control wheel and producing said electrical pulses.

9. The system as recited in claim 7 wherein said transducing means includes a magnet coupled to said control wheel, producing a rotating magnetic field having a rotational velocity proportional to said rotary movement, and a sensor inductively coupled to detect said magnetic field and produce said electrical pulses corresponding thereto.

10. The system as recited in claim 9 wherein said magnet is integrally formed with said control wheel.

11. The speedometer system of claim 1 wherein said digitized data relates to the number of rotations of said wheels produced during a period of time.

12. The speedometer system of claim 1 wherein said digitized data relates to the angular velocity of said wheels.

13. The speedometer system of claim 1 further including means, operating in conjunction with said producing means, for incorporating an identification code with said digital data signal, and wherein said processing means is further characterized in recognizing only those digital data signals containing said identification code.

14. The system as recited in claim 1 wherein said housing includes means for wearing said housing on the user's head and said display means is a visual display.

15. A speedometer system for skates comprising:

a roller skate including a sole with first and second opposed major surfaces and a plurality of wheels rollably attached to said second major surface;

transducer means for converting rotations of one of said plurality of wheels to electrical pulses means, coupled to receive said pulses, for computing an angular velocity based on said pulses and for producing a digital data signal containing computed angular velocities, said producing means positioned proximate to said first major surface;

receiver means, in wireless communication with said producing means, for receiving said digital data signal;

means, in communication with said receiver means, for processing said digital data signal to produce information related to said rotational movement, said information including a distance traversed by said roller skate;

display means, coupled to receive said information from said processing means, for producing a real-time visual representation of selected portions of said information; and a wrist-mounted housing containing said receiver means, said processing means, and said display means.

16. The system as recited in claim 15 wherein said transducer means and said producing means are both incorporated into a support housing which is removably disposed upon said first major surface.

17. The system as recited in claim 15 wherein said plurality of wheels are coaxially aligned along a longitudinal axis of said roller skate, and said roller skate includes a removable liner having a shape to receive and conform to a human foot and a lower portion of a leg extending upward therefrom, with both said transducer means and said producing means disposed between said roller skate and said liner, thereby being removably mounted within said roller skate.

18. The system as recited in claim 15 wherein said transducer means includes a source of light, mounted to said control wheel, and an optical sensor attached proximate to an aperture in said first major surface to detect light generated by said source of light, whereby said rotational movement of said wheel results in said optical sensor detecting light at a periodicity proportional to a rotational velocity of said control wheel and producing electrical pulses corresponding to said light detected.

19. The system as recited in claim 15 wherein said transducer means includes a magnet coupled to said control wheel, producing a rotating magnetic field having a rotational velocity proportional to said rotational movement, and a sensor inductively coupled to detect said magnetic field and produce electrical pulses containing information corresponding to said rotational movement.

20. A speedometer system for a roller skate comprising:

a roller skate having first and second opposed major surfaces with a plurality of wheels rollably attached to said second major surface and coaxially aligned along a longitudinal axis of said roller skate;

transducer means for detecting rotation of one of said plurality of wheels and producing electrical pulses in response thereto;

computer means for computing an angular velocity based on said pulses;

transmitter means, attached to said roller skate, for modulating a carrier wave with a digital representation of said computed angular velocity;

receiver means, in radio communication with said transmitter means, for receiving and demodulating said carrier wave, thereby reproducing said digital representation of said angular velocity;

means, electronically coupled to said receiver means, for processing said digital representation to produce information corresponding to said angular velocity, said information including velocity of said roller skate; and display means, in electrical communication with said processing means, for producing a real-time visual representation of selected portions of said information.

21. The system as recited in claim 20 wherein said transmitter means modulates said carrier wave with an identification code along with said pulses, with said receiver means being tuned to receive only those carrier waves modulated with said identification code.

22. The system as recited in claim 21 wherein said transducer means includes a magnet coupled to said control wheel, producing a rotating magnetic field having a rotational velocity proportional to said rotation of said wheel, and a sensor inductively coupled to detect said magnetic field and produce pulses corresponding thereto.

23. The system as recited in claim 22 wherein said magnet is integrally formed with said wheel.

24. The system as recited in claim 23 wherein said roller skate includes a shoe portion extending upward from said first major surface and shaped to receive a removable liner, said liner shaped to receive a human foot and a lower portion of a leg extending upward therefrom, with both said transducer means said transmitter means disposed between said first major surface and said liner.

* * * * *